United States Patent [19]

Brotsky

[11] 3,875,313

[45] Apr. 1, 1975

[54] METHOD OF TREATING MEAT

[75] Inventor: Eugene Brotsky, Highland Park, N.J.

[73] Assignee: Merck & Co., Inc., Rahway, N.J.

[22] Filed: Aug. 12, 1974

[21] Appl. No.: 496,777

Related U.S. Application Data

[63] Continuation-in-part of Ser. No. 356,007, April 30, 1973, abandoned, which is a continuation-in-part of Ser. No. 93,418, Nov. 27, 1970, abandoned.

[52] U.S. Cl. ............... 426/265, 426/222, 426/224, 426/264, 426/371, 426/377, 426/379, 426/382
[51] Int. Cl. .................... A22c 18/00, A23b 1/00
[58] Field of Search .......... 426/206, 222, 224, 227, 426/228, 264, 265, 371, 377, 379, 382, 213, 271, 378, 381

[56] References Cited
UNITED STATES PATENTS

| | | | |
|---|---|---|---|
| 2,788,281 | 4/1957 | Guadagni | 426/378 |
| 2,876,115 | 3/1959 | Epstein | 426/224 X |
| 3,104,978 | 9/1963 | Elder | 426/224 |
| 3,113,030 | 12/1963 | Brody | 426/271 X |
| 3,154,423 | 10/1964 | Voegeli et al. | 426/224 |
| 3,401,046 | 9/1968 | Mahon | 426/381 |

*Primary Examiner*—Hyman Lord
*Attorney, Agent, or Firm*—Frank M. Mahon; Harry E. Westlake, Jr.; Rudolph J. Anderson, Jr.

[57] ABSTRACT

Anhydrous sodium tripolyphosphate is hydrated with a solution of lemon juice, forming a dry granular mixture capable of long periods of storage with little or no reduction in anti-oxidant activity of the lemon juice or any of the desirable properties of the tripolyphosphate. Erythorbates or ascorbates may be used with the tripolyphosphate lemon juice mixture.

2 Claims, No Drawings

METHOD OF TREATING MEAT

This application is a continuation-in-part of prior co-pending application, Ser. No. 356,007, filed Apr. 30, 1973, now abandoned which is in turn a continuation-in-part of application, Ser. No. 93,418, filed Nov. 27, 1970, now abandoned.

The instant invention relates to new and useful meat treating compositions. More particularly, the instant invention relates to meat treating compositions in dry, free-flowing, homogeneous powder form comprising sodium tripolyphosphate hexahydrate in which the water of hydration contains lemon juice solids; to methods of preparing such compositions; and to methods of employing such compositions in the treatment of meat to maintain the color, taste and fresh quality thereof throughout prolonged cold and frozen storage and throughout the cooking process.

Sodium tripolyphosphate is known to be a safe additive for foods (see Hall, U.S. Pat. No. 2,513,904, "Curing of Meat to Inhibit Undesirable Color Change"). It has been used to control oxidative changes in foods (see the article by M. W. Zipser and B. M. Watts, 1961. "Oxidative Rancidity in Cooked Mullet," *Food Technology*, 15, 318). The anti-oxidant activity of sodium tripolyphosphate, however, is not effective for many types of foods. For example, sodium tripolyphosphate has very little effect on the oxidative instability of raw fatty fish. With respect to salmon, sodium tripolyphosphate has little or no effect on the oxidative changes in raw salmon flesh.

Small amounts of polyphosphates, including sodium tripolyphosphate, have been combined with a mixture of tetrasodium pyrophosphate, tetrapotassium pyrophosphate and disodium phosphate together with an acidulent such as citric acid, tartaric acid or other suitable food acid and employed in the curing of meats (see U.S. Pat. No. 2,876,115, Epstein, "Meat Processing and Composition Therefor"). Such compositions are said to aid in the softening of the cell membranes of meats allowing for better utilization of cell contents such as albumen and hemoglobin.

Sodium tripolyphosphate also has been employed as a component in compositions designed to preserve the red color of packaged meats (see U.S. Pat. No. 3,154,423, Voegeli et al., "Composition for Treating Meat Prior to Packaging"). The patentee employs a synergistic four component mixture comprising a poising agent to control oxidation-reduction potential, such as sodium and potassium salts of ascorbic acid, erythorbic acid and reductive acid; a sequestering agent to complex polyvalent metal ions, such as sodium and potassium salts of citric acid and tartaric acid; a food grade inhibitor of the removal of oxygen from air through bacterial activity, such as sodium and potassium salts of parahydroxybenzoic acid and sodium benzoate; a phosphate buffering agent which also may serve as a sequesterant such as sodium tripolyphosphate. In the working examples of the patent, meat products treated in accordance with the invention are described which contain 2,000 ppm added phosphate and 1,000 ppm each of added citric acid, ascorbic acid and benzoate.

Anhydrous sodium tripolyphosphate has been hydrated by various processes in the prior art to produce intimately admixed food additive compositions. In U.S. Pat. No. 3,401,046, Mahon, "Method of Making a Composition Useful in Meat Curing," a hydrate of tripolyphosphate and sodium nitrite or nitrate is used in meat curing.

Lemon Juice which has a relatively high content of ascorbic acid and other natural anti-oxidants together with significant quantities of citric acid, has been known to exert an effective anti-oxidant stability and flavor imparting action in various foods such as fruits, vegetables and meat products (see, for example, U.S. Pat. No. 2,788,281, Guadagni, "Increasing the Flavor and Other Quantities of Foods," and U.S. Pat. No. 3,113,030, Brody, "Method of Preparing a Liquid Meat Product"). Lemon Juice, however, has not achieved commercial importance in a number of potential applications because it is susceptable to attack by bacteria and, therefore, must be vacuum packaged or refrigerated, and being largely composed of water even in concentrated forms, it is relatively expensive to ship and to store. Lemon Juice has been prepared in powdered form, but it has not become commercially available as an anti-oxidant in this form either, partly because of the possibility of the loss of anti-oxidant activity during the dehydration process (note U.S. Pat. No. 3,298,838, Villarreal, "Process for Preparing Soluble Citrus Fruit Powder," on the loss of ascorbic acid during dehydration of citrus fruit juice), and partly because the dehydration process is relatively expensive. In addition, large portions of inert ingredients such as dextrose are required to enhance the drying and storage properties.

Ascorbic acid, its isomer erythorbic acid, and their sodium salts also are known to be safe and beneficial additives for foods. Although they have been used with sodium tripolyphosphate in admixture, they have never been used, so far as applicant is aware, with a sodium tripolyphosphate-lemon juice hydrate as contemplated by the instant invention.

As pointed out above, the instant invention, in its composition aspect, may be described as residing in the concept of a new and useful meat treating composition in dry, free-flowing, homogeneous powder form comprising sodium tripolyphosphate hexahydrate in which the water of hydration contains lemon juice solids. It is comtemplated that effective quantities of such hydrate will be employed in the treatment of meat, including poultry, red meat and fish, in order to maintain the color, taste and fresh quality of the meat throughout prolonged cold and frozen storage and throughout the thawing and cooking process.

The instant invention is based upon applicant's discovery that the sodium tripolyphosphate-lemon juice composition described above is useful not only for maintaining the color, taste and fresh quality of meat but affords many advantages not heretofore possible in known meat treating compositions. By use of the hydration technique, applicant has been able to combine sodium tripolyphosphate with a natural liquid product, lemon juice, so as to obtain a new single composition. The sodium tripolyphosphate-lemon juice composition of this invention is a completely homogeneous, dry, free-flowing powder in which the components are physically inseparable. The composition, therefore, will be of uniform composition throughout each package. The uneven distribution and non-uniform treatment which would be expected from a mixture of small quantities of lemon juice solids and sodium tripolyphosphate has been eliminated. Hydration with the natural moisture in lemon juice, or lemon juice concentrate, locks in a uniform composition and is economical. Further, the expense and difficulty of handling the natural liquid product, and/or the expense and difficulty of reducing the natural liquid product to a dry concentrate, has been eliminated while retaining in the hydrate the benefit of each of the individual components. Applicant has found also that the claimed compositions are effective in maintaining the color, taste and fresh qualities of meat even though the quantity of ascorbic acid and citric acid added to the meat in this form is far smaller than would have been expected from the teachings of the prior art to exert effective anti-oxidant action, and the need for added benzoate is totally eliminated. Further, applicant has found that, used with sodium erythorbate or ascorbate, the compositions of this invention are effective even to achieve oxidative stability in such foods as fresh pork sausage.

The sodium tripolyphosphate-lemon juice hydrate composition of this invention may be prepared by hydrating sodium tripolyphosphate with the lemon juice, preferably in concentrated form. The hydration step is performed in such a way and in such proportion of sodium tripolyphosphate to lemon juice that the resulting product is a dry, free-flowing powder. The preparation of the lemon juice tripolyphosphate composition should be performed bearing in mind that tripolyphosphate forms a hexahydrate. Although more than six moles of water for each mole of tripolyphosphate may be present, since part of the water may be evaporated during the hydration process because of the heat of hydration, it is recommended that not more than about six moles of water be present during the hydration process for each mole of anhydrous sodium tripolyphosphate. Ordinary lemon juice contains from about 90 to about 94 percent water (about 6 to about 10 percent solids). Commercial concentrated lemon juice will normally contain about 40 to about 65 percent water (about 35 to about 60 percent solids). For the hydration of sodium tripolyphosphate, it is preferred to use lemon juice containing about 63 percent water (about 37 percent solids) which has been diluted by the addition of at least half again as much water, up to an equal amount. Thus, the final lemon juice with which the sodium tripolyphosphate is hydrated and which is included in the term "Lemon Juice", preferably will contain from about 17 percent to about 38 percent lemon juice solids, and the balance water. However, any dry hydrate composition comprising sodium tripolyphosphate and lemon juice solids in a weight ratio of from about 7:1 to 70:1 may be used. Hydrates of this invention having such composition are added to the meat to be treated by any of the techniques conventional in the art. Effective results are obtained usually by employing the hydrate in quantities ranging from about 0.2 to about 0.6 percent by weight of the meat.

An indication of the anti-oxidant activity of lemon juice is obtained by using an assay for ascorbate in which the reduction of a dye, 2,6-dichlorophenolindophenol, is observed according to the procedure in M. B. Jacobs, *Chemical Analysis of Food and Food Products*, D. Van Nostrand Co., Princeton, N. J., 727 (1958). By this method, the average concentration of ascorbate in lemon juice is approximately 400 parts per million. The concentration of citric acid in lemon juice is about 60,000 parts per million.

The best mode contemplated by applicant for carrying out his invention is illustrated in the following working examples; no limitation being intended except as set forth in the appended claims.

EXAMPLE 1

Thirty milliliters of natural strength Borden REALEMON lemon juice (about 90 to about 94 percent water) were gradually mixed with 100 grams of anhydrous sodium tripolyphosphate. The resulting powder was then assayed for ascorbate content. The lemon juice sodium tripolyphosphate composition assayed 112.0 ppm of active ascorbate. The weight ratio of sodium tripolyphosphate to lemon juice solids exclusive of water of hydration is in the range of about 33.3:1 to about 56:1.

EXAMPLE 2

In this preparation, Sunkist concentrated lemon juice was added to anhydrous sodium tripolyphosphate in the amounts indicated with the results shown in Table 1.

TABLE I

| Sample | ml. concentrated lemon juice/100 grams sodium tripolyphosphate | percent (v/w) concentrated lemon juice in composition | Heat of Reaction ° F.* | pH | ppm calculated ascorbate | ppm assayed ascorbate | Comments | Weight ratio of sodium tripolyphosphate to lemon juice solids |
|---|---|---|---|---|---|---|---|---|
| 1 | 30 | 23.1 | 33 | 7.98 | 970 | 1270 | Hard, sticky powder | 7.6:1 |
| 2 | 25 | 20.0 | 29 | — | — | — | Hard, sticky powder | 9.1:1 |
| 3 | 20 | 16.7 | 30 | — | — | — | Hard, sticky powder | 11.4:1 |
| 4 | 15 | 13.0 | 26 | — | — | — | Hard, sticky powder | 15.1:1 |

*Increase in temperature due to the reaction.

EXAMPLE 3

Two rather small batches of lemon/juice tripolyphosphate concentrations were prepared according to a formula in which 15 and 20 milliliters of concentrated lemon juice and 15 and 10 milliliters of water were added respectively to 100 grams of anhydrous sodium tripolyphosphate. The results are shown in Table 2. The tendency of the composition to cake was tested by adding the composition to water and allowing it to stand, then attempting to disperse. A passing result is achieved if the composition is dispersed within one and one-half minutes.

TABLE II

| Sample | ml. concentrated lemon juice | ml. H₂O | percent-(v/w) concentrated lemon juice | Heat of Reaction °F | Caking test | Comments | Weight ratio of sodium tripolyphosphate to lemon juice solids |
|---|---|---|---|---|---|---|---|
| 1 | 15 | 15 | 11.7 | 55 | Passed | Free-flowing powder | 18:1 |
| 2 | 20 | 10 | 15.4 | 48 | Passed | free flowing powder | 13.5:1 |

Examples 4 and 5 illustrate the preparation of other compositions.

EXAMPLE 4

Four hundred fifty-four grams concentrated lemon juice (containing 63 percent water) and 227 milliliters water were added to 2,270 grams of food grade anhydrous sodium tripolyphosphate. They were mixed in a Hobart mixer. This produced a sticky mixture with a high tendency to cake. It was then dried for approximately two hours in a 225° oven. A blender was used to break up the large granules. The particles were screened on a U.S. No. 12 sieve. The weight ratio of sodium tripolyphosphate to lemon juice solids was 11.4:1 exclusive of water of hydration. The starting concentrated lemon juice assays 4700 ppm ascorbate.

EXAMPLE 5

A second mix was prepared with 454 grams concentrated lemon juice added to 2,270 grams anhydrous sodium tripolyphosphate. It was well mixed with a Hobart mixer and then dried overnight in a 104°F. oven. The large particles were then broken up in a blender and passed through a U.S. No. 12 sieve. The weight ratio of sodium tripolyphosphate to lemon juice solids is 11.4:1 exclusive of water of hydration. The starting concentrated lemon juice assays 4700 ppm ascorbate.

EXAMPLE 6

In this example, the treatment of salmon is described.

The procedure followed was to flex salmon steaks with a pre-measured amount of a treatment solution for 35 to 45 seconds depending on the thickness of the steak.

The treatment solutions are listed in Table 3. The sodium tripolyphosphate/lemon juice composition used for all samples bearing the numbers 4 and 5 were prepared by the method of Example 5. In these samples, 3 to 6 ppm ascorbic acid plus 225 to 420 ppm citric acid were added to the treated salmon through the lemon juice. The results of the tests are shown in Table III below.

TABLE III

| Treatment Solutions | |
|---|---|
| 1 | Sodium tripolyphosphate |
| 2 | Sodium hexametaphosphate plus salt |
| 3 | Sodium tripolyphosphate plus erythorbate |
| 4 | Sodium tripolyphosphate/lemon concentrate |
| 5 | Mixture of sodium hexametaphosphate plus salt and sodium tripolyphosphate/lemon concentrate |
| 6 | Sodium tripolyphosphate plus erythorbate plus salt |
| 7 | Control |

| Sample | Percent NaCl | 1 Day TBA | ppm Erythorbate/Ascorbate | Total P₂O₅ | Percent Natural P₂O₅ | Percent Added P₂O₅ | Percent Added Phosphate | Type of Phosphate |
|---|---|---|---|---|---|---|---|---|
| 1A | 0.148 | 3.30 | 5.13 | 0.927 | 0.587 | 0.340 | 0.569 | Tripoly |
| 2A | 0.396 | 1.62 | 8.97 | 0.842 | 0.587 | 0.255 | 0.372 | Hexameta |
| 3A | 0.132 | 0.82 | 394.00 | 0.966 | 0.587 | 0.379 | 0.655 | Tripoly |
| 4A | 0.182 | 1.29 | 10.30 | 0.942 | 0.587 | 0.355 | 0.615 | Tripoly |
| 5A | 0.264 | 0.82 | 11.60 | 0.888 | 0.587 | 0.301 | 0.481 | Tripoly |
| 6A | 0.479 | 0.65 | 186.00 | 0.881 | 0.587 | 0.294 | 0.509 | Tripoly |
| 7A | 0.132 | 2.55 | 12.80 | 0.587 | 0.587 | — | — | — |
| 1B | 0.148 | 2.31 | 7.70 | 0.881 | 0.625 | 0.256 | 0.442 | Tripoly |
| 2B | 0.396 | 2.41 | 7.70 | 0.788 | 0.625 | 0.163 | 0.238 | Hexameta |
| 3B | 0.115 | 1.63 | 250.0 | 0.757 | 0.625 | 0.132 | 0.228 | Tripoly |
| 4B | 0.165 | 0.90 | 10.3 | 0.803 | 0.625 | 0.178 | 0.308 | Tripoly |
| 5B | 0.264 | 1.18 | 8.97 | 0.904 | 0.625 | 0.279 | 0.446 | Tripoly |
| 6B | 0.595 | 0.50 | 186.00 | 0.927 | 0.625 | 0.302 | 0.523 | Tripoly |
| 7B | 0.132 | 2.42 | 8.97 | 0.625 | — | — | — | — |

| Sample | Net Frozen Weight | Net Thaw Weight | Percent Drip | Cook Weight | Cook Yield Percent Based on Thaw Weight |
|---|---|---|---|---|---|
| 1C | 220.0 | 218.9 | 0.500 | 184.6 | 84.3 |
| 2C | 190.8 | 190.0 | 0.420 | 161.2 | 85.0 |
| 3C | 217.2 | 216.2 | 0.460 | 184.8 | 85.2 |
| 4C | 249.2 | 248.3 | 0.361 | 217.8 | 87.6 |
| 5C | 224.8 | 224.0 | 0.355 | 195.2 | 87.3 |
| 6C | 229.0 | 228.5 | 0.218 | 199.8 | 87.4 |
| 7C | 213.1 | 204.5 | 4.04 | 170.0 | 83.3 |
| 1D | 190.6 | 189.5 | 0.579 | 157.5 | 83.0 |
| 2D | 203.7 | 202.8 | 0.444 | 172.5 | 85.3 |
| 3D | 222.0 | 220.9 | 0.495 | 187.9 | 85.0 |

—Continued

| Sample | Net Frozen Weight | Net Thaw Weight | Percent Drip | Cook Weight | Cook Yield Percent Based on Thaw Weight |
|---|---|---|---|---|---|
| 4D | 185.7 | 185.0 | 0.377 | 156.7 | 84.8 |
| 5D | 217.2 | 216.8 | 0.184 | 185.9 | 85.8 |
| 6D | 220.9 | 220.1 | 0.362 | 190.1 | 86.5 |
| 7D | 240.9 | 230.0 | 4.54 | 193.6 | 84.0 |

| Sample | Appearance | Taste | Texture |
|---|---|---|---|
| 1C, 1D | Very pale pink, some yellow noticeable, almost as bad as 7 | bland, not much better than 7 | improved over 7 |
| 2C, 2D | Very pale pink, some yellow noticeable, almost as bad as 7 | bland, not much better than 7 | improved over 7 |
| 3C, 3D | Light red, faded somewhat when cooked | fair, better than 1 and 2 | improved some over 1 and 2 |
| 4C, 4D | Medium to dark red, next in line to 6 | second in preference to 6, lemon could be detected | almost as good as 6 |
| 5C, 5D | Light red, some fade when cooked | almost same as 4 | almost as good as 6 |
| 6C, 6D | Best of series both before and after cook; Dark red, very little protein cooked out | best of series — some salt detected | excellent |
| 7C, 7D | Worst appearance after thaw and cook; yellow, oily, white protein globs | oily and bland | poor, oily |

NOTES: Salmon were cooked in oven at 520°F. for 15 minutes to an internal temperature of 162°F.

EXAMPLE 7

To demonstrate the operability of the instant invention with the inclusion of sodium erythorbate, and to show the benefits thereof, several compositions were made and tests run. The compositions were as follows:

COMPOSITION I

Thirty milliliters of concentrated lemon juice (63 percent water) were hand mixed with 100 grams anhydrous sodium tripolyphosphate. The weight ratio of sodium tripolyphosphate to lemon juice solids is 7.6:1 exclusive of water of hydration.

COMPOSITION II

A twenty percent solution of sodium erythorbate in concentrated lemon juice was prepared. Thirty milliliters of this solution were hand mixed with 100 grams of anhydrous sodium tripolyphosphate. The weight ratio of sodium tripolyphosphate to lemon juice solids is 11.3:1 exclusive of water of hydration.

COMPOSITION III

A solution including 20 percent sodium erythorbate was prepared using REALEMON natural strength lemon juice. Thirty milliliters of this solution were hand mixed with 100 grams of anhydrous sodium tripolyphosphate. The weight ratio of sodium tripolyphosphate to lemon juice solids is 70:1 exclusive of water of hydration.

Pork sausage was then prepared using the above compositions and their components in various amounts. The samples were refrigerated for various periods, as indicated in Table IV.

TABLE IV

RANCIDITY DEVELOPMENT IN REFRIGERATED FRESH PORK SAUSAGE

| Sample | Treatment | Type | pH | TBA VALUE 4 day | 10 day | 18 day |
|---|---|---|---|---|---|---|
| 1 | CONTROL | cooked | -- | 4.80 | 8.50 | 9.50 |
| 2 | 200 ppm Erythorbate | cooked | -- | 5.00 | 19.50 | 17.00 |
| 3 | 0.5% Tripoly | cooked | -- | 1.75 | 2.10 | 2.85 |

TABLE IV – Continued

RANCIDITY DEVELOPMENT IN REFRIGERATED FRESH PORK SAUSAGE

| 4  | 0.65% Composition I   | cooked | --   | 1.50 | 1.80 | 2.45 |
|----|-----------------------|--------|------|------|------|------|
| 5  | 0.65% Composition II  | cooked | --   | 1.20 | 1.50 | 1.30 |
| 6  | 0.65% Composition III | cooked | --   | 1.45 | 1.40 | 1.30 |
| 7  | CONTROL               | raw    | 5.85 | 1.80 | 4.70 | 7.30 |
| 8  | 200 ppm Erythorbate   | raw    | 5.90 | 1.35 | 5.95 | 7.50 |
| 9  | 0.5% Tripoly          | raw    | 6.25 | 0.85 | 1.40 | 1.40 |
| 10 | 0.65% Composition I   | raw    | 6.10 | 1.05 | 1.60 | 2.60 |
| 11 | 0.65% Composition II  | raw    | 6.05 | 0.80 | 1.20 | 0.85 |
| 12 | 0.65 Composition III  | raw    | 6.18 | 0.75 | 1.40 | 0.70 |

NOTE: All samples contained 80 grams ground pork, 2 percent NaCl and sufficient water to make 100 grams.

Thus, there may be included in the tripolyphosphate/lemon juice compositions of this invention up to about 5.0 percent by weight of a compound selected from the group consisting of ascorbic acid, erythorbic acid, and their sodium salts. It is preferred to use from about 2.5 percent to about 5.0 percent by weight based on the hydrated tripolyphosphate/lemon juice composition.

The subject matter which applicant regards as his invention is particularly pointed out and distinctly claimed as follows:

1. The method of making a meat treating composition comprising dry, homogeneous, free-flowing sodium tripolyphosphate hexahydrate wherein the water of hydration contains lemon juice solids which comprises hydrating anhydrous sodium tripolyphosphate with the equivalent of six moles of an aqueous solution containing 6 to 37 percent by weight of lemon juice solids per mole of sodium tripolyphosphate.

2. The method of treating meat to maintain the color, taste and fresh quality thereof which comprises adding to such meat prior to cold or frozen storage from 0.2 to 0.6 percent by weight of the meat of a dry, homogeneous, free-flowing sodium tripolyphosphate hexahydrate in which the water of hydration contains lemon juice solids in an amount equivalent to one part by weight per 7 to 70 parts by weight of the sodium tripolyphosphate.

* * * * *